Patented Jan. 11, 1938

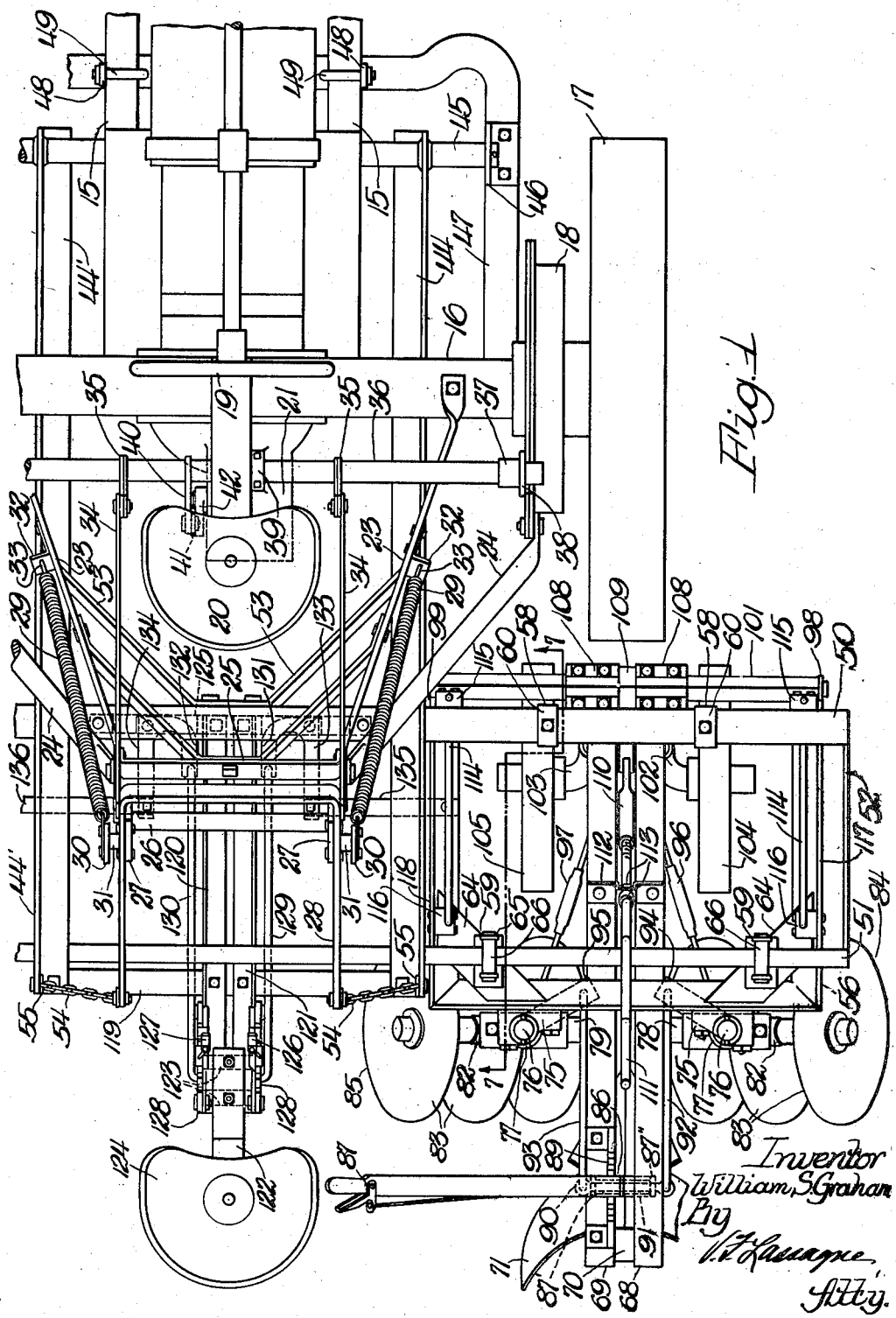

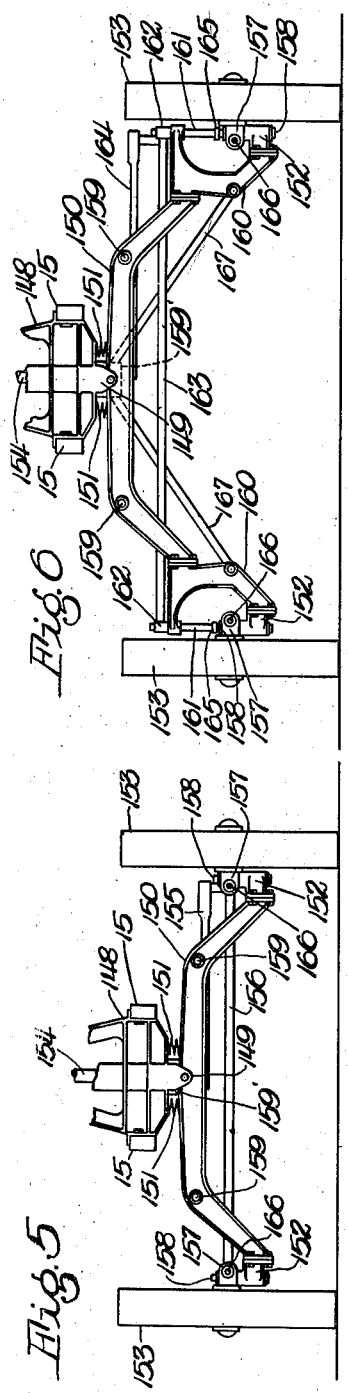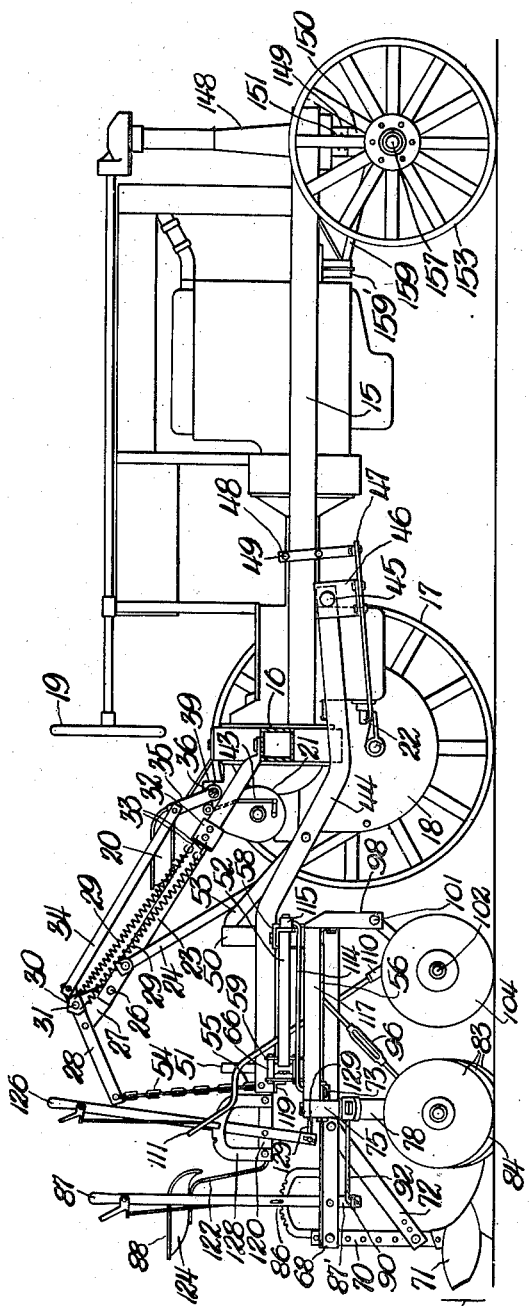

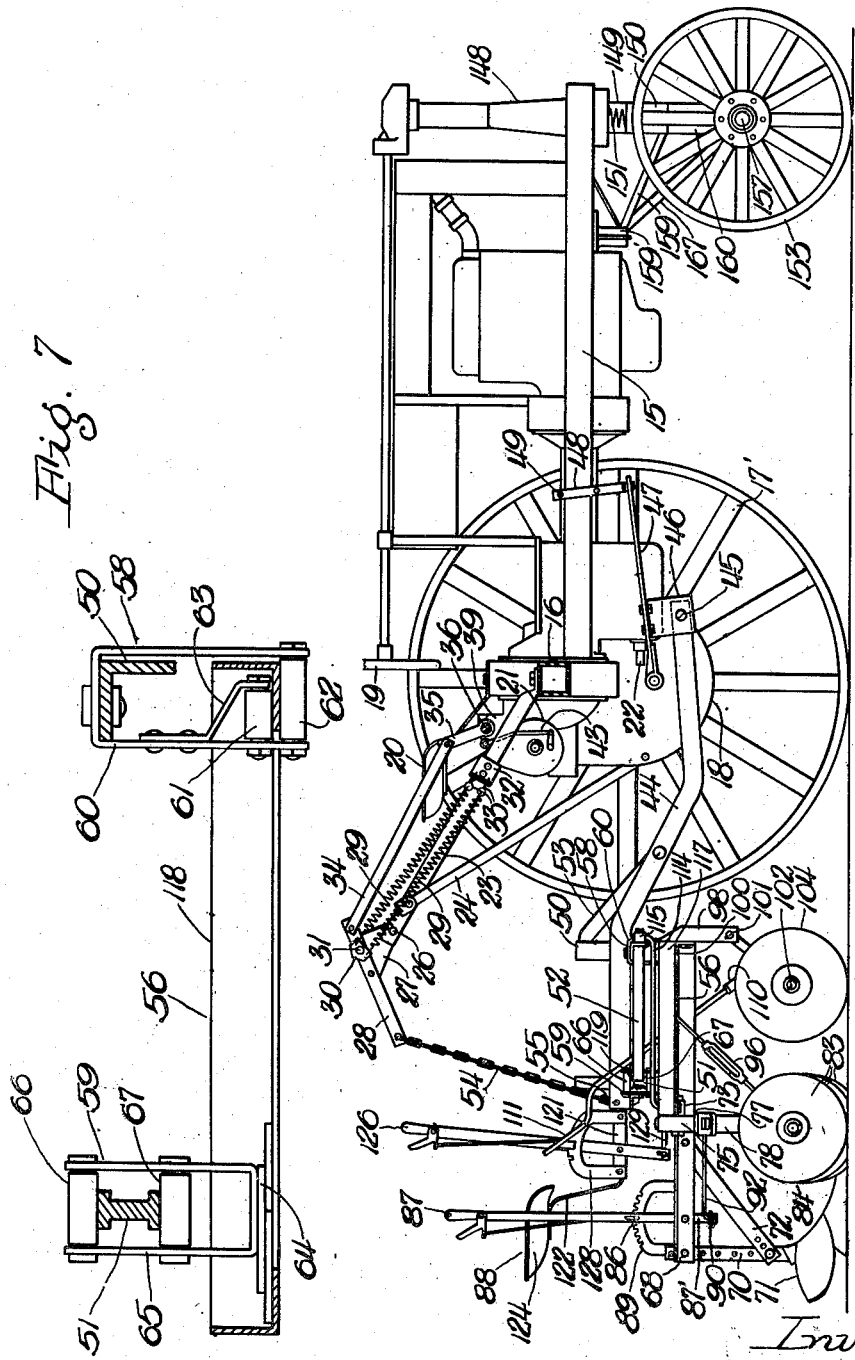

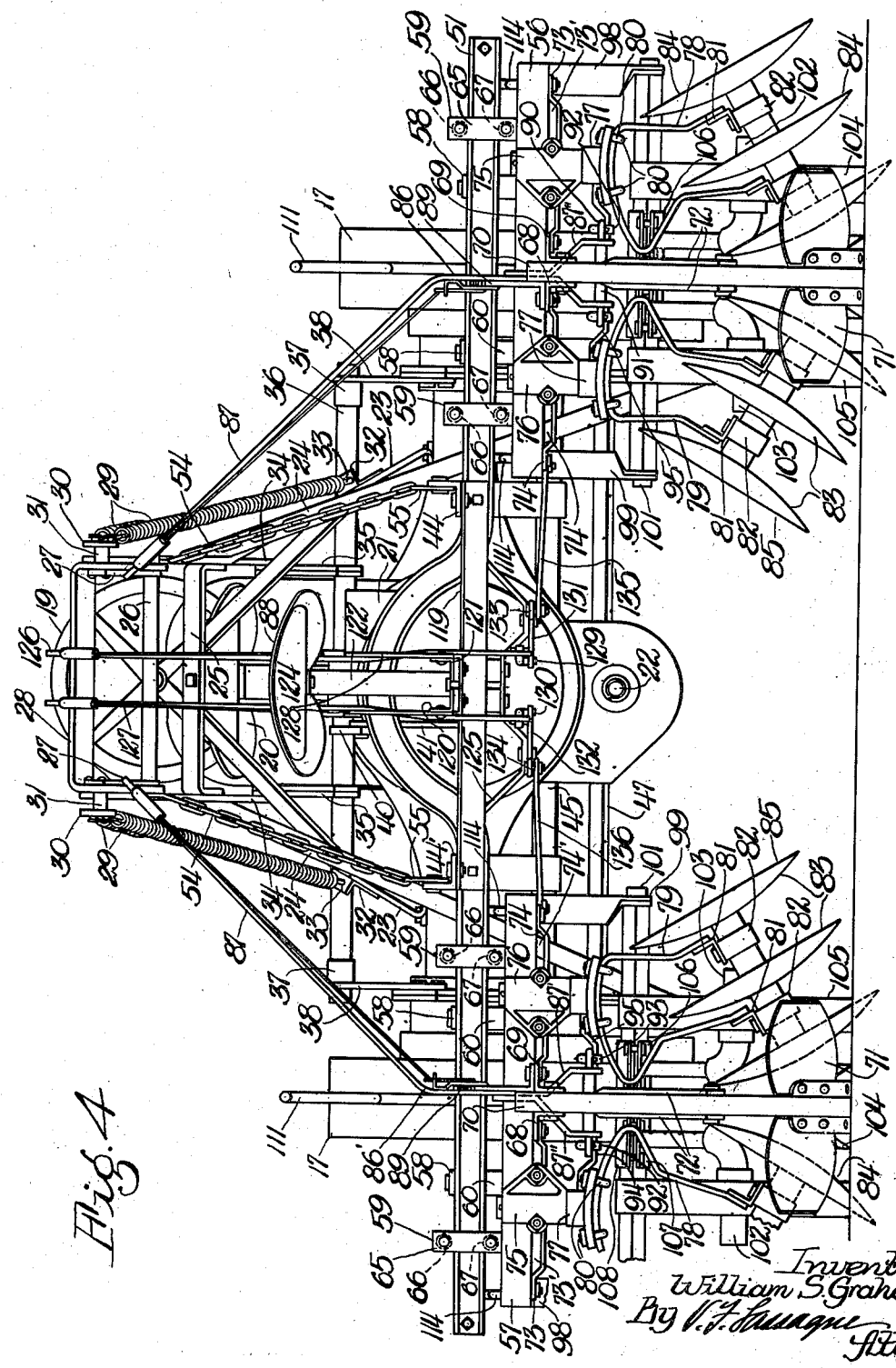

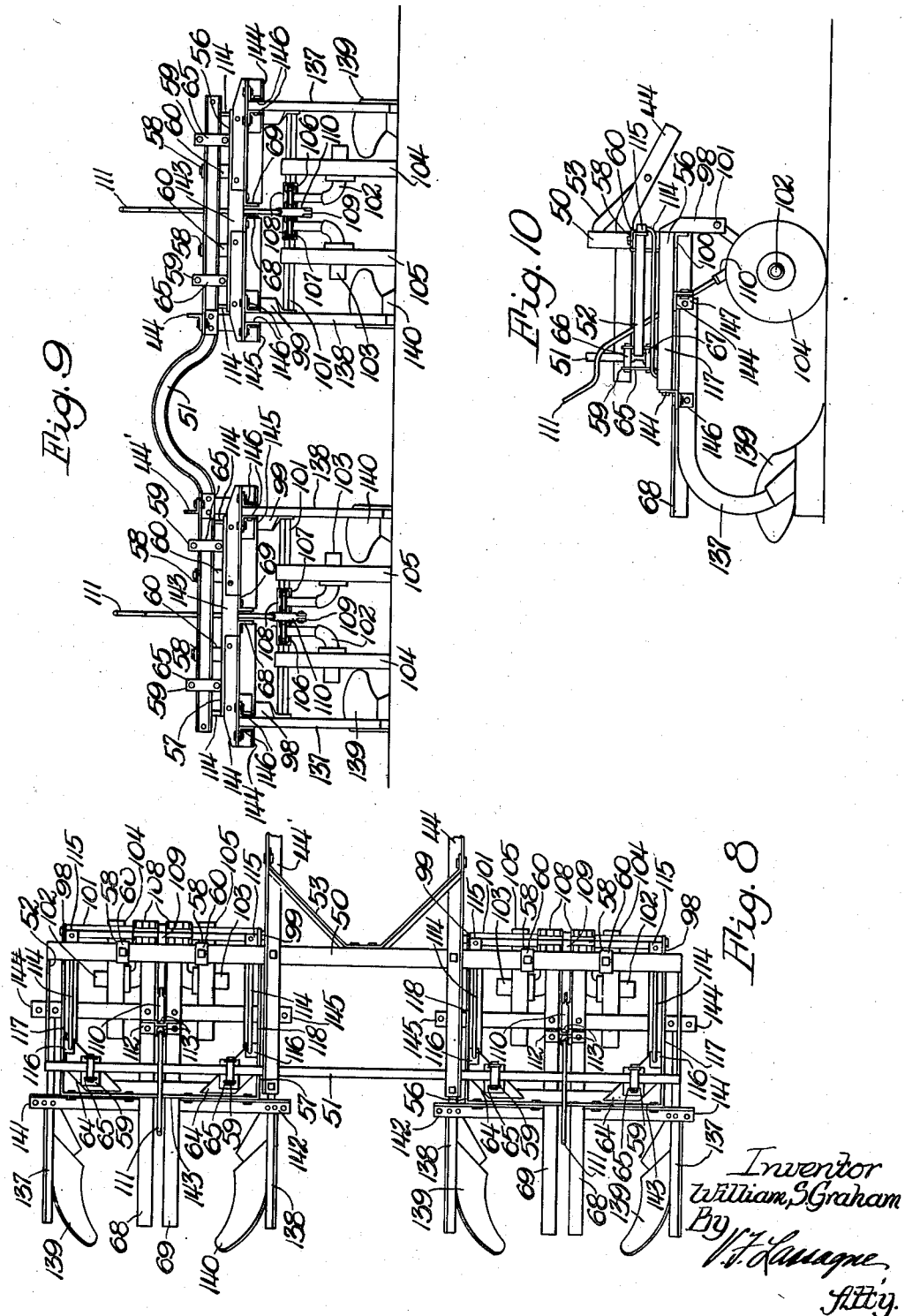

2,105,117

UNITED STATES PATENT OFFICE 2,105,117

IMPLEMENT ATTACHMENT FOR TRACTORS

William S. Graham, Canton, Ill., assignor to International Harvester Company, a corporation of New Jersey Application February 29, 1936, Serial No. 66,354

14 Claims. (Cl. 97—47)

This invention relates to implement attachments for tractors and more specifically to a disk cultivator attachment for a cane cultivator directly connected to a tractor.

The main object of the invention is to provide a cane cultivator attachment for a tractor of the general purpose type.

Another object is to provide the cultivator attachment with mechanism whereby the disk cultivator gangs may be moved laterally.

Another object is to provide an operator's station on the cultivator attachment so that the attachments may be operated by the operator from the operator's station on the implement.

Another object of the invention is to provide a bedding or wrapping attachment which may be substituted for the disk cultivator attachment.

Another object of the invention is to provide adjustable disk gangs which may be adjusted for in-throw and out-throw working of the soil and also adjustable laterally for the correct working of the soil of the cane beds.

Another object of my invention is to adapt this cane cultivator to tractors equipped with high wheels.

Another object of my invention is to provide a power lift mechanism operated from the tractor engine to raise and lower the implement frame structure.

Other objects and advantages will appear in the following description of a preferred embodiment of the invention as illustrated in the accompanying drawings, wherein:

Figure 1 is a plan view of the rear portion of a tractor with a cane cultivator attached;

Figure 2 is a side elevation of the tractor with the right rear wheel removed showing the cane cultivator attachment in working position, the tractor being of the low frame type and the cane cultivator attachment adjusted for the low frame working position;

Figure 3 is a side elevation of the tractor with the right rear wheel removed and having the high wheel attachment to elevate the tractor frame showing the cultivator with the high frame attaching parts in position;

Figure 4 is a rear view showing the cane cultivator attachment in position;

Figure 5 is a front view showing the wide type steering truck with the tractor frame at its normal working height;

Figure 6 shows the attachment for making a high frame tractor attached to the wide type front steering truck construction to elevate the tractor frame;

Figure 7 is a sectional view on line 7—7 of Figure 1 looking in the direction of the arrows showing the method of mounting the cultivator subframe;

Figure 8 is a plan view of the wrapping attachment substituted for the disk cultivator attachment;

Figure 9 is a rear view of the wrapping attachment; and

Figure 10 is a side elevation of the wrapping attachment.

The invention is herein disclosed in combination with a tractor comprising longitudinal frame members 15 connected at their rear ends to a transverse axle housing 16 containing differentially driven shafts which drive each of the traction wheels 17 through gearing in depending housings 18. This type of tractor is best disclosed in the United States Patent No. 1,683,165 to J. E. Anthony et al. granted January 11, 1927. That patent discloses a tricycle type tractor, but it is to be understood that the tricycle type of steering truck may be replaced with a forecarriage of the automobile type. It is with the latter type of tractor that the preferred embodiment of my invention is to be disclosed. The forecarriage may be of the high wheel extension or the low wheel type which is standard equipped, both types of which will be disclosed herein. The tractor is steered through a steering wheel 19 adjacent an operator's station 20. Attached to the rear axle housing 16 at its mid-portion is a power lift attachment 21 similar to that disclosed in the United States Patent No. 1,911,373 to Alexus C. Lindgren granted May 30, 1933.

This power lift attachment 21 is of the one-half revolution clutch type and is driven from the engine of the tractor through a shaft extending through the axle housing and geared to the transmission through suitable slip shafts and clutches. The tractor has the usual power take-off shaft 22 which may be used to drive other attachments separate from the power lift mechanism. It is also to be understood that the power lift attachment may take other suitable modifications. It is also to be understood that the tractor may take other modifications of well-known commercial type constructions.

Figures 1, 2, 3 and 4 show the construction of the superstructure for supporting the cane cultivator and the construction of the frame work for mounting the tillage tools. The superstructure, which is in the nature of a rearwardly extending boom, comprises upwardly and rearwardly inclined boom members 23 laterally spaced and secured to the transverse axle housing 16. The boom members 23 are braced by upwardly and rearwardly inclined boom braces 24 secured at their lower ends to the depending housings 18 and at their upper ends to the boom members 23 which are laterally spaced at their upper ends by a boom spreader brace 25. Pivotally mounted on the upper ends of the boom members 23 is a lifting rockshaft 26 which has laterally secured thereto, lifting plate members 27. Attached to the lifting plate members is a U-shaped lifting bail 28, with the legs of the bail extending rearwardly. Eccentric to the rockshaft and connected to the lifting bail 28 are counterbalancing springs 29 pivotally connected at their upper ends to studs on an attaching plate 30 which acts as an equalizer and is pivoted on a stud 31. The stud 31 is secured to the lifting bail 28 midway between a line perpendicular from the center of the rockshaft to the plane of the lifting bail and the base of the lifting bail. The counterbalancing springs 29 are adjustably connected to brackets 32 secured to the boom members 23 and the springs are adjusted by adjusting bolts and nuts 33.

The power lift attachment 21 is operatively connected to reciprocate or oscillate the lifting bail 28 in a to and fro movement in a vertical plane. Pivotally and eccentrically connected at their upper ends to the lifting bail 28, the lifting links 34 are also pivotally connected at their lower ends to lifting arms 35 secured to a power lift rockshaft 36 and laterally spaced thereon. The rockshaft 36 is rotatably mounted in bearings 37 mounted in rockshaft supporting brackets 38. The center of the rockshaft is also rotatably supported to give more rigidity to the rockshaft by a center bearing 39 secured to the power lift attachment casing 21. A rockshaft arm 40, which is secured to the rockshaft 36, is pivotally connected to a pitman strap 41 at its upper end. The pitman strap 41 is connected at its lower end to a lifting lever 42, which is operatively connected to a power lift clutch of the one-half revolution type, such as disclosed in the previously mentioned Lindgren patent, or to other power lift modifications which need not be described for the understanding of my invention. The power lift attachment 21 is operated by a handle 43 extending within reach of the operator's station 20; and, through the mechanism previously set forth, the lifting bail 28 is reciprocated or oscillated in a to and fro movement in a vertical plane to its raised or lowered position intermittently at the desire of the operator. The power take-off shaft 22 may also be run continuously at the same time as the lifting mechanism is operated. A lever, not shown, may be operated to throw the power take-off shaft 22 out of gear with the tractor engine. The implement frame of the cane cultivator to which the tillage tools are attached comprises rearwardly extending right and left frame side angles 44 and 44' respectively which are secured by welding or in another suitable manner to a transverse draft member 45. The transverse draft member 45 is rotatably mounted in supporting brackets 46 secured to a U-shaped draft bail 47 which has been reversed to its normal position and extends forwardly from the depending housings 18 to which it is pivotally mounted. The U-shaped draft bail 47 is supported from the side sills or frame members 15 of the tractor by depending supporting members 48 which are clamped to the side sills 15 by U-shaped clamp bolts 49 and are secured at their lower ends to the draft bail 47 in the usual manner. The frame side angles 44 and 44', respectively, extend underneath the rear axle housing 16 to where they are attached to the draw-bar; and, the rear portions of the frame side angles extend upwardly and then horizontally. To the horizontal portion of the frame side angles 44 and 44' are secured a front transverse frame member 50 and a rear transverse frame member 51, as best shown in Figures 1, 2, 3, 4, and 7. The front frame member 50 is formed from a structural member in the shape of an angle while the rear frame member 51 is formed from an I beam section. The mid-portions of the members 50 and 51 are bent upwardly in the shape of a circular or other curved structure to provide clearance and to provide rigidity for the transverse frame structure. The ends of the members 50 and 51 are securely braced by members 52 connecting the members 50 and 51. It is necessary to thus securely brace the transverse frame structure to prevent its going out of shape because of the heavy strains set up in cultivating. The frame side angles are also braced to the front transverse frame member 50 by a V-shaped brace 53 which is secured to the front transverse frame member 50 and the side frame members 44 and 44'. It is thus seen that a rigid transverse supporting frame is formed to which a subframe for attaching implement tools may be mounted. Pivotally attached to the U-shaped lifting bail 28 are lifting members 54 in the nature of a flexible chain. The lifting members 54 are pivotally connected to straps 55 which are pivotally secured to the right and left hand frame side angles 44 and 44', respectively. The lifting members 54 are attached in such a manner at their upper ends to the lifting bail 28 that the distance between the lifting bail and the side frame members 44 and 44' may be increased or decreased at will depending on the depth at which it is desired to cultivate and also whether the cultivator attachment is used with the high wheel attachment or the low wheel attachment. It is, therefore, seen that upon the actuation of the power lifting mechanism, the transverse frame construction will be raised and lowered as desired.

Mounted underneath the transverse frame construction are two depending subframes 56 and 57. The subframes 56 and 57 are supported from a plurality of downwardly extending front and rear hanging brackets 58 and 59. Each front supporting bracket 58, as best shown in Figure 7, comprises a U-shaped member 60 secured to the front transverse frame member 50. The bight portions of the member 60 extend downwardly and carry upper and lower supporting rollers 61 and 62 respectively. The lower roller 62 is supported between the ends of the U-shaped member 60, while the upper roller is supported between one leg of the U-shaped member 60 and an additional supporting member 63. The upper and lower rollers 61 and 62 are spaced apart a sufficient amount to enable the subframe 56 to be supported therebetween for lateral translational movement. The rear supporting brackets 59 are supported from diagonal corner tie braces 64 which are used to stiffen the subframes 56 and 57, respectively. The rear brackets 59 are formed from U-shaped members 65, the bight portions of which extend upwardly and have rotatably mounted therebetween upper and lower rollers 66 and 67 respectively. The upper and lower rollers 66 and 67 are spaced apart a sufficient amount that the rear transverse frame member 51 may be mounted between the rollers. It is thus seen that the roller mountings enable the subframes 56 and 57 to have a transverse translational movement underneath the main transverse frame. The subframes 56 and 57 are made from a single angle iron bent in the shape of a rectangle with one of the legs extending upwardly. Secured to each subframe 56 and 57, respectively, are two fore and aft extending frame members 68 and 69. These members are secured to the mid-portion of each of the subframes 56 and 57 and extend rearwardly therefrom. These members 68 and 69 are each respectively secured to the front and rear transverse portions of the subframes. The members 68 and 69 form a longitudinal beam construction to which is attached a sweep or middle buster bottom. As each subframe construction is similar, only one will be described and similar reference characters will denote similar parts on each subframe construction. The longitudinal beam members 68 and 69 are spaced apart laterally a sufficient amount to enable an upwardly extending shank 70 to be mounted therebetween. The shank 70 has a plurality of adjusting holes thereon to allow for vertical adjustment of a shovel, sweep or middle buster bottom 71. The standard 70 is suitably braced by members 72 which may be adjustably secured at their rear ends to the standards 70 and are pivotally mounted at their forward ends between the longitudinal beam members 68 and 69, as best shown in Figures 2 and 3. Attached to the rear transverse portion of the subframes 56 and 57 are two guide members 73 and 74. These guide members 73 and 74 are mounted underneath the subframes 56 and 57 and spaced therefrom to form adjusting slots 73' and 74', respectively. This construction is best shown in Figure 4. Adjustably mounted and supported on the subframes 56 and 57 are the supporting brackets or pivot castings 75 and 76. These supporting brackets may be adjusted laterally by means of clamp bolts passing through the slots 73' and 74' clamping the brackets 75 and 76 to the rear portions of the subframes 56 and 57. Journaled in the supporting brackets or pivot castings 75 and 76 for rotation about a vertical axis are disk gang heads 77. Attached to the disk gang heads are yoke standards 78 and 79. The yoke standards are arcuately shaped at their upper ends to conform to the arcuate shape of the disk gang head 77 so that the gangs may be adjusted vertically in an angular manner by clamp bolts 80 securing the yoke standards to the disk gang heads. As shown in Figures 1 and 4, the disk gangs are set as out-throw gangs, but it is to be understood that the disk gangs may be reversed for in-throw purposes. The yoke standards 78 and 79 are attached to supporting brackets 81 which are secured to bearings 82. Journaled in the bearings 82 are the usual disk bearing spools through which are positioned the arbor bolts supporting disks 83. In order to adjust disk gangs 84 and 85, respectively, in a horizontal plane, there is mounted on the longitudinally extending beam structure formed by the members 68 and 69 an adjusting mechanism 86. Each set of gangs attached to the subframes 56 and 57 is adjusted in a similar manner by their respective adjusting mechanisms 86 and 86'. As each adjusting mechanism is similar only one will be described. Pivoted between the beam members 68 and 69 at their rear portions are adjusting levers 87. The adjusting levers 87 are bent inwardly within reach of a centrally mounted operator's station 88. The levers are adjusted and locked in adjusted position by the usual detent and quadrant 89. The quadrant 89 is secured to the beam member 69 on the right subframe and is supported by the beam 68 on the left subframe 57. The detent is actuated by the usual thumb latch. The lever 87 extends below the beam members 68 and 69 and has formed thereon a lateral and downwardly extending portion 87'. A similar portion 87", as best shown in Figure 4, is laterally spaced therefrom and secured to the lower end of the lever 87 and is pivoted on the same axis as the portion 87' of the lever. Journaled within the lower portion of the lever 87 formed by the members 87' and 87" are eye members 90. The eye members 90 are secured at their inner ends to a pipe spacer 91. The eye portion of the eye members 90 are outside of the members 87' and 87" on which the eye members are journaled. Attached to these eye members 90 are forwardly extending adjusting links 92 and 93 which are pivotally secured to link supporting arms 94 and 95, which in turn are secured to the disk gang heads 77 of the disk gangs 84 and 85, respectively. The link supporting arms extend inwardly from the disk gang heads 77. It is, therefore, seen that by operating the lever 87 forwardly that the gangs 84 and 85 are adjusted simultaneously in a horizontal plane to whatever angle it is desired to operate the disk gangs. The disk gangs 84 and 85 have adjustable draft members 96 and 97 attached at their lower ends to the inner supporting bracket 81 of each disk gang respectively and at their upper ends to the longitudinal beam members 68 and 69 respectively. The adjustable draft members 96 and 97 are made in two parts with a turn buckle for adjusting the position of the gangs forwardly or rearwardly.

In order to gauge the tillage tools previously described, gauge wheels are adjustably supported on the forward portions of the subframes 56 and 57, respectively. Each gauge wheel adjusting mechanism on the subframes 56 and 57 is similar so only one will be described and similar reference characters will denote similar parts on each subframe. Downwardly extending supporting brackets 98 and 99 are secured to the forward portion of the subframes 56 and 57. The members 98 and 99 are additionally braced by braces 100 secured to the subframes 56 and 57, respectively and to the supporting members 98 and 99. Journaled at the lower ends of the downwardly extending supporting brackets is a transverse draft member 101. The transverse draft member 101 is in the form of a square bar. Axle members 102 and 103 to which gauge wheels 104 and 105 are journaled are connected at their forward ends to the transverse draft member 101. The gauge wheels 104 and 105 are in the shape of gong wheels, although any other type of gauge wheel or shoe may be used. The upper ends of the axle members 102 and 103 are secured to clamping members 106 and 107, as best shown in Figure 4. The members 106 and 107 are clamped to the transverse draft member 101 by clamping members 108, respectively. In order to adjust the gauge wheels vertically, there is attached to the rockshaft or draft member 101 a downwardly inclined adjusting arm 109. At the lower end of the arm, there is pivotally attached a screw-threaded adjusting member 110. Telescopically and adjustably mounted in the adjusting member 110 is a manual adjusting lever 111. This adjusting lever 111 extends to within reach of the operator's station 88 and is rotatably mounted in a bracket or support 112. Studs 113 on each side of the member 112 retain the adjusting member in a fixed position so that as the lever 111 is adjusted the member 110 is adjusted thereon which in turn rocks the transverse draft member 101, thus raising or lowering the adjusting wheels simultaneously. The member 112 is secured to the draft members 68 and 69, while the adjusting member 111 is positioned between the members 68 and 69. It is, therefore, seen that a simple mechanism is obtained for adjusting the gauge wheels. Each subframe 56 and 57 has its respective gauge wheel adjusting mechanism.

In order that each subframe may follow the furrows to be cultivated, each subframe, as previously described, has been mounted for translational movement laterally with respect to the main transverse frame. In order to obtain a substantially parallel movement of each subframe with respect to the main transverse frame, parallel links 114 are pivotally secured to the front transverse frame member 50 by supporting brackets 115 laterally spaced thereon. The links 114 extend rearwardly and are pivotally attached through connecting brackets 116 secured to each side member 117 and 118 respectively of the subframes 56 and 57. As each of these parallel draft link structures is similar for each subframe only one has been described. The parallel links 114 also act to transmit the draft forces of the tillage tools secured to each subframe to the main transverse frame. It is, therefore, seen that with these parallel draft connections, as the tractor with the attached cane cultivator drives down the ridges to be cultivated, the gauge wheel will follow the rows laterally in and out regardless of whether the rows are straight or crooked.

Sometimes it is necessary in cane cultivation that the cane beds be broken down and thrown either in or out, depending upon the cultivation needed. In this case, it is necessary to have an operator ride the cane cultivator and attend to all of the various adjustments necessary for the tillage tools attached to the cultivator. In this case, it is sometimes necessary to have the subframes 56 and 57 moved to different lateral positions, as the cultivator is driven down the field. In order to do this it is necessary to provide an operator's station where the operator may sit. This may be in the nature of a special attachment as the cultivation with this type of tool is so slow that the cultivator may be followed by a person walking and the tools adjusted from the ground, or they might be adjusted by the operator of the tractor, but it is preferable to have this separate operator's station. A transverse member 119 is secured to the rear ends of the main frame side angles 44 and 44'. Secured to the mid-portion of the transverse member 119 are two longitudinally extending members 120 and 121, which are in the shape of angle irons with one of the legs extending upwardly in order to form a channel shaped section to which a seat support 122 is attached by means of clamp members 123. At the upper end of the seat support 122 is positioned a seat 124 which forms the operator's station 88. The members 120 and 121 extend forwardly to where they are secured to a substantially W-shaped member 125. The member 125 is secured at each end to the front transverse frame member 50. In order to adjust the subframes 56 and 57, transverse adjusting levers 126 and 127 extend upwardly within reach of the operator and are located at the rear ends of the members 120 and 121. The lever 126 is used to adjust the subframe 56, while the lever 127 is used to adjust the subframe 57. Each lever is adjusted in the usual manner by thumb latch and detent about adjusting quadrant 128. The levers 126 and 127 are pivoted respectively to the members 120 and 121. At the lower ends of each lever are pivotally attached adjusting links 129 and 130. These links 129 and 130 extend forwardly to where they are attached to U-shaped members 131 and 132. The members 131 and 132 may be considered as bell cranks and are pivotally attached to the W-shaped member 125. Arms 133 and 134 of the members 131 and 132, respectively, extend rearwardly. At the ends of these members are pivotally mounted laterally extending links 135 and 136 which are connected respectively to the subframes 56 and 57, as best shown in Figure 1. It is, therefore, seen that, by adjusting the levers 126 and 127, the subframes may be adjusted laterally in or out depending upon the cultivation required.

Several operations may be performed with the cane cultivator just described, but there are also other operations in which special tools are needed. The operation is known as wrapping and this consists in throwing trash toward the center and wrapping it with soil on the top. This attachment is disclosed in Figures 8, 9, and 10. This attachment is attached to the subframes 56 and 57 after the disk cultivator and the middle buster have been removed. The wrapping attachment is used with the gauge wheels and the attachment consists of two plow beams attached to throw the furrow inwardly behind the gauge wheels. With this attachment the old cane ridges are broken down and thrown into the center where they are later thrown back again by the cultivator attachment previously described. Each wrapping attachment comprises a plurality of plow beams 137 and 138 which are laterally spaced on each subframe 56 and 57, respectively. At the rear ends of the plow beams are secured right and left hand plows 139 and 140. The beams 137 and 138 are adjustably mounted at their rear ends to transverse members 141 and 142 which are secured to a rear transverse member 143 of the subframes 56 and 57, respectively. As the main parts of the transverse main frame and the subframes are similar to those previously described, like references characters will denote similar parts. As each wrapping attachment attached to the subframes is similar to the other only one will be described. The forward ends of each beam 137 and 138 are secured to transverse members 144 and 145 which are secured at their inner ends to the longitudinally extending beam members 68 and 69 and at their outer ends to the side members 117 and 118 of the subframes 56 and 57 respectively. The rear portions of the plow beams 137 and 138 may be adjusted laterally in and out by means of adjusting brackets 146 attached to the plow beams 137 and 138 and to the rear supporting members 142 and 143. The front ends of the beams 137 and 138 are adjusted in and out laterally in a similar manner by front adjusting connections 147 which are secured to the beams 137 and 138 and to the transverse members 144 and 145. As each subframe 56 and 57 has attached thereto the gauge members previously described and also has the parallel draft links 114, it is obvious that the wrapping attachment will follow down each furrow between the cane rows without any guidance except that of the furrow wheels. The wrapping attachment, therefore, will follow any deviation to the right or left of the cane row and similarly the wrapping attachment on the other side of the main frame and attached to its respective subframe will also follow the deviations in the rows. It is, therefore, seen that a very simple wrapping attachment has been provided to be attached to a cane cultivator.

As the weight of this cane cultivator which is directly connected to the tractor is very great, it is necessary at times to provide means to counterbalance the moment of rotation caused by the cane cultivator about the rear tractor wheel by additional weight in the form of a counterweight 148', as best shown in Figure 3. The effect of the counterweight plus the weight of the tractor in front of the rear wheel tends to counterbalance the moment of rotation caused by the weight of the cane cultivator attachment.

As the cane shoots grow, it is necessary to keep on with the cultivation, but at the same time, it is necessary to provide more clearance underneath the tractor. In order to accomplish this a high wheel attachment is used. This is best shown in Figures 3 and 6. The usual tractor construction for the first cultivation is shown in Figures 2 and 5 where the standard height of wheels is used. The usual front tricycle type of steering truck, as disclosed in the patent to Anthony et al. 1,613,865, granted January 11, 1927 is replaced by the wide axle construction, as best shown in Figure 5. The usual front bolster, as disclosed in the patent to Anthony is replaced by another bolster 148, as shown in Figure 5. Pivoted to a downwardly extending supporting member 149 of the bolster is a transverse wide axle member 150. Springs 151 attached to the bolster 148 limit the vertical transverse motion of the transverse axle 150. Secured to the ends of the axle 150 are removable spindle brackets 152 to which the stub axles for mounting wheels 153 are connected. The wheels 153 are steered from a steering shaft 154 which is connected to the steering wheel 19 in the usual manner as previously disclosed in the patent to Anthony et al. by a steering rod 155 and a tie rod 156 connecting axles 157 mounted on spindles 158. The transverse axle 150 is braced in the usual manner by a wish-bone 159 mounted in a bracket 159' secured to the tractor frame. As shown in Figures 3 and 6, when it is necessary to use the high frame attachment, the rear wheels 17' are substituted for the low wheels 17, as shown in Figures 2 and 3. In order to raise the front part of the tractor, special axle brackets 160 are substituted for the brackets 152, as best shown in Figure 6. Then the old axle brackets 152 are secured to the new brackets 160 so that the regular low wheels 153 may be used. An extension spindle 161 is attached to the spindles 158 and is journaled in a lateral extension of the bracket 160 connecting rearwardly extending arms 162. Secured to the ends of the spindle 16 is a tie rod 163. This tie rod 163 is longer than the tie rod 156. Similarly, steering rod 164 is longer than the steering rod 155. The wheels are therefore steered in the usual manner through the steering shaft 154 connected to the steering rod 164. The extension spindle 161 is journaled on the upper ends of the spindles 158 and at the lower end of the spindle 161 are attached rearwardly extending arms 165 which are in turn connected to rearwardly extending arms 166 to which the tie rod 156 of the low frame attachment was connected. Therefore, it is seen that the rearwardly extending arms 165 being connected to the rearwardly extending arms 166 actuate the axles 157 to steer the tractor. In order to brace the extension brackets 160, an additional wish-bone brace 167 is used besides the wish-bone 159 and is secured to the bracket 159'. It is, therefore, seen that a front steering truck attachment has been disclosed which may be used for the tractor in its low frame position and which by the attaching of a few simple parts may be readily converted into a high frame wide axle type steering truck to support the tractor in an elevated position. When the high frame attachment is used, as disclosed in Figures 3 and 6, it is necessary to reverse the supporting bracket 46, as shown in Figure 3 from the position disclosed in Figure 2 when the attachment is used with the tractor in its normal position. At the same time, it is necessary to position the cultivator attachment rearwardly from the position shown in Figure 2 to that shown in Figure 3 in order to clear the larger wheels 17'. In order to do this the bracket 46 is placed rearwardly on the drawbar 47 to that disclosed in Figure 2 and the lifting chains 54 are increased in length to accommodate the change in position of the cultivating attachment.

In the operation of the cane cultivator attachment, the operator sets the disk gangs, as best shown in Figure 4 and as previously described. If he wishes to build up the cane beds, they are set as shown in Figure 4 for in-throw cultivation; but, if he wishes to cut away the cane beds to aerate them the gangs are reversed 180 degrees from that shown in Figure 4. The disk gangs may be adjusted laterally in either direction on each subframe, as previouly described, and the cut of the gangs may also be adjusted by the levers 87. The depth of the gauge wheels to determine the depth of penetration of the disks is adjusted by the adjusting lever 111. As the implement frame is lowered into cultivating position, the raising or lowering chains 54 determine the maximum depth to which the implements may penetrate, although they are controlled by the gauge wheels primarily, the chains performing a lost motion connection between the raising and lowering mechanism and the implement frame. In transporting the cane cultivator, the operator trips the lever 43 of the power lift attachment 21 and with the motor running and the power lift shaft 36 having been put in motion the cane attachment is either raised or lowered and in this preferred embodiment the raising and lowering is accomplished in one-half revolution of the clutch. On completion of its cycle, the raising and lowering mechanism is locked in its raised or lowered position and the chain 54 forms a lost motion connection between the implement frame and the raising and lowering mechanism. The counterbalancing springs 29 may be adjusted to counterbalance the weight of the implement frame, and in so doing lightens the load on the power lift. As previously pointed out the wrapping attachment, as shown in Figures 8, 9, and 10, may be attached to the subframes after the removal of the disk gangs and the center middle buster attachment.

It is also to be understood that other attachments in the nature of cultivating tools or planting attachments may be attached to the implement frame or to the subframes without departing from the scope of the invention. Also, the operator may cultivate or break down the beds by the use of the adjusting levers 126 and 127 which actuate the subframes 56 and 57 to be moved laterally in or out depending upon the kind of cultivation desired. As has also been previously pointed out, it is generally necessary to counterbalance the cane cultivator attachment by weights secured to the front end of the tractor or they may be secured to the front wheels of the tractor. In the cultivating operation the gong wheels are set quite close together. The disks are tilted so as to work on the sides of the bed, the inside disks contacting with the ground about 12 inches apart. The middle buster 71 following behind gets some of the dirt loosened by the disks and runs through the ground throwing up the dirt to the extent of about two inches. The dirt during this operation is thrown up toward the cane keeping the furrow as deep as it was if not cutting it slightly deeper. When the tractor is mounted on the low drive wheels, as shown in Figure 2, one or two cultivating operations are performed. As the cane grows tall the tractor is boosted up for higher clearance and additional cultivating operations are performed. The cane cultivator disclosed is known as a two-row cane cultivator. In the operation known as wrapping the wrapping attachment disclosed in Figures 8, 9, and 10 is used. The term wrapping is one used by all cane growers which means throwing trash toward the center and wrapping it with dirt on top. In other operations the gong wheels of the gauge mechanism are set extremely wide and reversed on the boxing and only the disk gangs are used. In this operation the idea is to chop the dirt in between the balks. In another operation the gauge wheels are still left in their outer positions and the disks as well as the middle buster are used and in this operation what is known as sinking of the middles starts again and only enough dirt is thrown up to reach the upper corner of the balks. In another operation the middles are sunk still deeper and dirt thrown toward the cane at this stage the cane being tall enough that some dirt can be thrown into it. The front bolster weight attachment is used when it is necessary for the final cultivating operations. To get the tractor up for higher clearance it is necessary to move the cultivator back so as to clear the large diameter rear wheels 17'. When this is done there are times when additional weights are required to hold down the front end of the tractor. The tread of the wheels on the tractor for low clearance is narrower than when boosted up for the high clearance. When the tractor with the low clearance is used with the cane cultivator attachment the tread of the tractor is narrow. When the tractor is used with the high wheel attachment the wheels are set wide and spaced to run in the center of the 6-foot rows which is a decided advantage in cane cultivation.

From the preceding description it is evident that there has been provided an attachment which may be readily connected to and disconnected from the tractor for subsequent attaching of other tractor mounted implement attachments. Furthermore, a cane cultivator attachment has been provided for a tractor of the general purpose type which will meet all the requirements of cane cultivation.

The preferred embodiment of this invention herein described is capable of certain modifications without departure from the scope of the invention to be defined in the following claims.

What is claimed is:

1. In a tractor attached implement comprising a boom structure extending rearwardly from said tractor, said tractor having a power lift attachment operated from the motor of said tractor, lifting means mounted on said boom structure and actuated from the power lift attachment, the combination with said boom structure of an implement frame connected to said tractor and positioned underneath the lifting means to which the implement frame is connected whereby the weight of the implement frame may be properly distributed in transport position upon the operation of said power lift attachment, said implement frame comprising a main transverse frame, a subframe, ground engaging tools mounted on said subframe, and means for slidably mounting said subframe for a free lateral movement of translation whereby said ground engaging tools are free to follow the furrows of plant rows.

2. The combination with a tractor having a draft connection and a power lift attachment operated from the motor of said tractor, of a tractor drawn implement comprising an implement frame pivoted to said tractor draft connection, means for supporting said implement frame from said tractor in transporting position, means mounted on said supporting means and connected to said implement frame and power lift attachment for raising and lowering said implement frame, said implement frame comprising a main transverse frame and a plurality of subframes slidably mounted on said main frame, and means mounted on said main frame and connected to said subframes whereby each subframe may be adjusted relative to the other and to the main frame.

3. In a tractor attached implement comprising a supporting structure extending rearwardly from said tractor, said tractor having a power lift attachment operated from the motor of said tractor, means mounted on said supporting structure for to and fro movement in a vertical plane and actuated from the power lift attachment for raising and lowering said implement, the combination with said supporting structure of an implement frame connected to said tractor and positioned underneath the first mentioned means to which the implement frame is connected by a lost motion means whereby the weight of the implement frame may be properly distributed in transport position upon the operation of said power lift attachment, said implement frame comprising a main transverse frame, a subframe slidably mounted thereon, ground engaging tools mounted on said subframe, and gauge means mounted on said subframe whereby said ground engaging tools may be gauged by the gauge means as the lost motion connection between the first mentioned means and the implement frame permits the rise and fall of the implement frame in accordance with the position of the gauge means.

4. The combination with a tractor having a draft connection and a power lift attachment operated from the motor of said tractor, of a tractor drawn implement comprising an implement frame pivoted to said tractor draft connection, means connected to said tractor for supporting said implement frame from said tractor, means mounted on said supporting means and connected to said implement frame and power lift attachment for raising and lowering said implement frame, said implement frame comprising a main transverse frame, a subframe, ground engaging tools mounted on said subframe, means for slidably mounting said subframe for a free lateral movement of translation, and ground engaging gauge means mounted on said subframe to follow the furrows of plant rows whereby said ground engaging tools attached to the subframe may follow the lateral movement of the gauge wheels.

5. The combination with a tractor having a draft connection, of a tractor drawn implement comprising an implement frame pivoted to said tractor draft connection, said implement frame comprising a main transverse frame having a center arch construction for plant clearance, and a plurality of subframes slidably mounted on said transverse frame and positioned on each side of the center arch construction.

6. The combination with a tractor having a draft connection, of a tractor drawn implement comprising an implement frame pivoted to said tractor draft connection, said implement frame comprising a main transverse frame, a plurality of subframes slidably mounted on said transverse frame, said subframes having a center beam construction, means for adjustably attaching ground engaging tools thereto, a plurality of supports adjustably mounted on said subframes for lateral movement, ground engaging tools mounted on said supports, and means for angularly adjusting said ground engaging tools in a horizontal plane.

7. The combination with a tractor having a draft connection, of a tractor drawn implement comprising an implement frame pivoted to said tractor draft connection, said implement frame comprising a main transverse frame, a plurality of subframes slidably mounted on said transverse frame, said subframes having a center beam construction, means for adjustably attaching ground engaging tools thereto, a plurality of supports laterally mounted on said subframes, ground engaging tools mounted on said supports, and means for angularly adjusting said ground engaging tools in a vertical plane.

8. The combination with a tractor having a draft connection, of a tractor drawn implement comprising an implement frame pivoted to said tractor draft connection, said implement frame comprising a main transverse frame, a plurality of subframes slidably mounted on said transverse frame, said subframes having gauge means mounted thereon, and means on each subframe for vertically adjusting the gauge means in a longitudinal vertical plane.

9. The combination with a tractor having a draft connection, of a tractor drawn implement comprising an implement frame pivoted to said tractor draft connection, said implement frame comprising a main transverse frame, a plurality of subframes slidably mounted on said transverse frame, an operator's station centrally positioned on said main transverse frame, and adjusting means at said operator's station connected to said subframes for independently adjusting each of said subframes laterally with respect to each other and to the main transverse frame.

10. The combination with a tractor having a draft connection, of a tractor drawn implement comprising an implement frame pivoted to said tractor draft connection, said implement frame comprising a main transverse frame, a plurality of subframes slidably mounted on said transverse frame, subframes having gauge means mounted thereon, a plurality of draft means laterally spaced on said subframes, and ground engaging tools mounted on said draft means.

11. The combination with a tractor having a draft connection, of a tractor drawn implement comprising an implement frame pivoted to said tractor draft connection, said implement frame comprising a main transverse frame and a subframe slidably supported on said transverse frame, and draft means connecting said main transverse frame to said subframe and permitting lateral movement of said subframe.

12. The combination with a tractor having a draft connection, of a tractor drawn implement comprising an implement frame pivoted to said tractor draft connection, said implement frame comprising a main transverse frame and a subframe slidably supported on said transverse frame, and parallel draft links connecting said main transverse frame to said subframe and limiting the lateral movement of said subframe.

13. The combination with a tractor having a draft connection, of a tractor drawn implement comprising an implement frame pivoted to said tractor draft connection, said implement frame comprising a main transverse frame and a plurality of laterally spaced subframes slidably supported on said transverse frame, and draft means connecting said subframes to said main transverse frame, permitting lateral movement of said subframes with respect to each other and the main transverse frame and limiting the lateral movement of each subframe about its draft connection on the main transverse frame.

14. The combination with a tractor having a draft connection, of a tractor drawn implement comprising an implement frame pivoted to said tractor draft connection for vertical movement, said implement frame comprising a main transverse frame and a plurality of subframes slidably mounted on said transverse frame, an operator's station positioned on said main transverse frame, ground engaging tools adjustably mounted on said subframes, means for adjusting said ground engaging tools, and means for laterally adjusting said subframes on said transverse main frame, each of said adjusting means extending within reach of the operator's station on the main transverse frame.

WILLIAM S. GRAHAM.